Patented Oct. 12, 1943

2,331,434

UNITED STATES PATENT OFFICE 2,331,434

PRODUCT CONTAINING ZEIN AND PROCESS OF MAKING SAME

Richard R. Sitzler, Cumberland, Md., assignor to Celanese Corporation of America, a corporation of Delaware No Drawing. Application February 2, 1940, Serial No. 316,981

4 Claims. (Cl. 106—153)

This invention relates to the production of artificial materials prepared from naturally occuring protein materials. It relates more particularly to the production of films and filaments from zein which have a markedly increased toughness and flexibility.

An object of this invention is to produce artificial materials and especially films and filaments which are composed of protein materials and especially those composed of zein.

Another object of this invention is to produce these films and filaments of protein materials which have materially lessened brittleness and are suitable for commercial application in the form of yarn, films, foils, plastics and in various other forms.

Still other objects of the invention will appear in the following description.

Filaments, films and the like composed solely of zein lack many desirable qualities and the quality most lacking is that of flexibility. Thus, where such films are subjected to a flexing stress they tend to snap into pieces because of their brittleness.

I have found that the addition of various proportions of urea or other carbonic acid amides or the derivatives thereof to products containing zein greatly decreases their brittleness. These compounds may be incorporated by their addition to solutions of zein in various organic solvents or mixtures of solvents to give solutions which can be transformed by kneading, casting, extrusion and the like into films, foils, yarns, filaments, fibres, plastic masses, etc. The addition of this class of organic plasticizers to these solutions greatly increases the desirable qualities of the above mentioned materials and yields a strong, tough and flexible product.

While I prefer to employ urea in this invention, other carbonic acid amides or their derivatives may be used. Examples of these are the thioureas such as phenyl thiourea, guanidines such as diphenyl guanidine, mono-, di, and trimethylurea, the corresponding ethylureas, phenyl, diphenyl, methyl-phenyl, methyl-diphenyl, benzyl, methyl-benzyl, dimethyl-benzyl, naphthyl and methyl-naphthyl-urea, etc.

The solutions of zein suitable for the preparation of these materials may contain varying proportions of zein, depending on the type of film desired and the method by which it is to be prepared, i. e., extrusion, flowing, etc., I have discovered that excellent zein films may be prepared by flowing solutions containing from 10 to 50% by weight of zein dissolved in a suitable organic solvent. Often it is desired to add to the solution, formaldehyde or other aldehyde to prevent gelling of the solution. The amount of aldehyde may vary from 2% to about 7%, based on the weight of the zein included in the solution. Larger amounts may be used if desired.

The solvents which are suitable for use in preparing films, filaments, yarns, fibres, etc., from zein may be any suitable ones and may be used alone or in admixture with each other in varying proportions. Various solvents such as ethyl alcohol, ethylene glycol, diethylene glycol, the mono-methyl and mono-ethyl-ethers of ethylene glycol, mono-methyl ether of diethylene glycol, morpholine, pyridine, ethylene chlorhydrin and "Triton B" (trimethyl-benzyl-ammonium hydroxide) are suitable. Mixtures of ethylene formal and alcohols such as methyl or ethyl alcohol are especially suitable for the preparation of spinning dopes on account of their high volatility. This high volatility may be decreased by the addition of higher boiling liquids, such as the mono-ethyl ether of ethylene glycol when the solutions are being used for the preparation of films. A mixture of methyl alcohol and the mono-ethyl ether of ethylene glycol is also an excellent solvent medium for preparing films of zein.

Films or foils may be flowed out or cast onto various smooth surfaces such as the metal surfaces of film wheels or bands glass, etc. Copper or other metal plates or surface coated with mercury amalgam may be used to facilitate the stripping of the film or foil therefrom.

Filaments, yarns or fibres of zein may be made by extrusion of the solution of the same through spinnerettes into a heated atmosphere, as in dry spinning, or into a coagulating bath, as in wet spinning.

In order further to illustrate my invention, but without being limited thereto, the following specific examples are given:

Example I 7.5 parts by weight of urea are dissolved in 70 parts by weight of a solvent mixture composed of 75% methyl alcohol and 25% "cellosolve," i. e., the mono-ethyl ether of ethylene glycol. To this solution are added 1.5 parts by weight of formaldehyde to delay the gelling of the zein solution to be formed. There is then added to the entire solution 30 parts by weight of zein and the whole solution stirred until it forms a clear solution.

The solution is then flowed on to the smooth surface of a film wheel and the volatile solvent caused to evaporate. The film is stripped from the surface and forms a hard, tough and flexible sheet.

Example II

A solution is formed in the manner described in Example I, which solution contains 10 parts by weight of zein, 90 parts by weight of a solution of ethylene formal and methyl alcohol in which the ethylene formal is 70% by volume, 0.5 of a part by weight of formaldehyde and 2 parts by weight of urea. The clear, colorless solution is then extruded under pressure through the orifices of a spinnerette into a closed chamber through which heated air passes. The resulting zein filaments are then wound, with or without twisting, on to a bobbin or other package. There is obtained a strong, flexible yarn.

It is to be understood that the foregoing detailed description is merely given by way of illustration and that many variations may be made therein without departing from the spirit of my invention.

Having described my invention, what I desire to secure by Letters Patent is:

1. A solution for use in the production of films, foils, filaments and the like comprising from 10 to 50% by weight of zein dissolved in a solvent mixture consisting of ethylene formal and methyl alcohol, said solution containing from 20 to 25%, based on the weight of the zein present in the solution, of urea and from 2 to 7%, based on the weight of the zein, of formaldehyde.

2. A solution for use in the production of films, foils, filaments and the like comprising 10% by weight of zein dissolved in a solvent mixture consisting of 70% by volume of ethylene formal and 30% by volume of methyl alcohol, said solution containing 20%, based on the weight of the zein present in the solution, of urea and 5%, based on the weight of the zein, of formaldehyde.

3. Process for the production of films, foils, filaments and the like, which comprises extruding through suitable orifices into an evaporative atmosphere a solution comprising from 10 to 50% by weight of zein dissolved in a solvent mixture consisting of ethylene formal and methyl alcohol, said solution containing from 20 to 25%, based on the weight of the zein present in the solution, of urea and from 2 to 7%, based on the weight of the zein, of formaldehyde.

4. Process for the production of films, foils, filaments and the like, which comprises extruding through suitable orifices into an evaporative atmosphere a solution comprising 10% by weight of zein dissolved in a solvent mixture consisting of 70% by volume of ethylene formal and 30% by volume of methyl alcohol, said solution containing 20%, based on the weight of the zein present in the solution, of urea and 5%, based on the weight of the zein, of formaldehyde.

RICHARD R. SITZLER.